Patented Dec. 21, 1948

2,456,661

UNITED STATES PATENT OFFICE 2,456,661

CANE WAX PRODUCTION

Edward A. Wilder, Racine, Wis., assignor to S. C. Johnson & Son, Inc., Racine, Wis.

No Drawing. Application November 5, 1947, Serial No. 784,301

12 Claims. (Cl. 260—428.5)

This invention relates to the production of cane wax. More particularly, it relates to an improved method of extracting a hard wax from crude sugar cane wax subsequent to the removal of the resinous portion. Various methods are known for separating crude sugar cane wax from clarification muds, or other sugar cane factory waste by the use of an organic solvent such as toluene. Several investigators have separated hard wax from the crude sugar cane wax. One such method is described by Balch in U. S. Patent No. 2,381,420. The hard wax recovered by these methods, has a resinous content of approximately 20%. This resinous portion is a black pitch-like material with no definite melting point, but which softens at temperatures varying from about 100° to 160° C.

While some work has been done on the removing of the resinous matter from the hard wax after the hard wax has been recovered from the crude cane wax, the methods proposed to date require the retreatment of the hard wax and thus increases the cost of obtaining a deresinated hard wax because of the multiplicity of operation necessary.

Heretofore in the various methods proposed for obtaining the hard wax, a wax solvent was selected which at the melting point of the crude cane wax would place the crude cane wax in solution and upon cooling the solvent wax mixture to a temperature of 35° C. or less the hard fraction containing the resinous matter would precipitate and was recovered, for example, by filtering.

Now, in accordance with my invention, I have developed a method of treating crude cane wax with a selective solvent which at the melting point of the wax will place the waxy portion in solution, but does not dissolve the resinous matter. In this manner the resinous matter may be removed from the wax solvent mixture prior to the cooling of the mixture to precipitate the hard wax.

My method thus comprises contacting crude cane wax with at least three times its weight of propyl alcohol at a temperature sufficient to place the wax portion in solution while maintaining the alcohol in liquid phase, then separating the insoluble portion while the waxy portion remains in solution. The filtrate may then be cooled to a temperature of not more than 35° C. to precipitate the hard wax, and the hard wax then separated from the soft fraction. While n-propyl alcohol may be used, iso-propyl alcohol is preferred.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

Twenty parts of crude cane wax were placed in a vessel together with 157 parts of iso-propyl alcohol, and heated to a temperature between 81° to 83° C. until the solution was complete. The wax solvent mixture was filtered while the temperature of the mixture was not allowed to fall to less than 80° C., and a resinous portion constituting 18% by weight of the crude cane wax was removed. The filtrate was then cooled to a temperature of about 27° C. and filtered. The deresinated hard fraction comprising 41.5% of the crude cane wax was recovered as filter cake and the solvent driven off by heating. The filter cake was washed with additional iso-propyl. The soft fraction which consisted of 40.5% of the crude cane wax was recovered from the filtrate by stripping the solvent.

Example 2

Example 1 was repeated except that after deresinization by removal of 18% of resin the filtrate was cooled to 21° C. rather than 27° C. The hard fraction recovered was 50% while the soft fraction was 32% of the crude cane wax.

Example 3

Example 1 was repeated except that after deresinization by removal of 18% of resinous matter the filtrate was cooled to 15° C. The hard fraction recovered constituted 57% and the soft fraction 25% of the crude cane wax.

Example 4

Example 1 was repeated except that 25 parts of crude cane wax and 393 parts of iso-propyl alcohol were used. The resinous matter removed constituted 20.2% of the crude cane wax.

Example 5

Example 1 was repeated except that 25 parts of crude cane wax and 79 parts of iso-propyl were used. The resinous matter removed constituted 15% of the crude cane wax.

Example 6

Example 1 was repeated except that n-propyl alcohol was used instead of iso-propyl alcohol.

The resinous portion removed constituted 12% of the crude cane wax.

From the foregoing examples a method has been illustrated by which the resinous matter may be efficiently removed from crude cane wax prior to the separation of the hard wax and soft fraction.

The selective solvent used may be either n-propyl or iso-propyl alcohol, but iso-propyl alcohol is preferred. Other related alcohols have been tried, but do not appear to be equivalent as the properties of propyl alcohol appear to be unique in this process as a selective solvent.

It is essential that the crude sugar cane wax be heated until it is placed substantially in solution in the propyl alcohol. It is also essential that the propyl alcohol remain in the liquid phase. Generally a temperature of 81° to 83° C. will be sufficient to place the wax in solution and at the same time keep the solvent in liquid phase. It will be understood, of course, that if it is desired to use temperatures above the boiling point of the propyl alcohol that sufficient pressure will be used to keep the solvent in liquid phase.

Care should be taken during the filtering for the removal of the resinous matter that the temperature of the wax solution be maintained at around 80° C. to prevent precipitation of the hard fraction.

After the resinous matter has been removed such as by filtration, the temperature of the filtrate should be lowered to not more than 35° C. and preferably between 15° and 30° C. If the temperature is lowered below 21° C., there is inclusion of a small part of the soft fraction in the hard fraction.

The minimum ratio of crude wax to solvent is 1 part of crude wax to 3 parts of solvent. The preferred range, however, is from about 1 part crude cane wax to within the range of from 8 to 15 parts of the solvent. While more than 15 parts of solvent per part of cane wax can be used, no improvement in deresinization is obtained and since the solvent must be removed after separation, it is of no advantage to use amounts of solvent above the preferred range.

Thus, by the process of my invention, I have succeeded in removing the resinous matter from crude cane wax prior to the separation of the hard fraction from the soft fraction. In this manner by the use of one solvent and a simplified method I have succeeded in separating crude cane wax into the resinous matter, hard fraction and soft fraction.

I wish it to be understood that I do not desire to be limited to the exact details of the method shown and described, for obvious modifications will occur to a person skilled in the art.

I claim:

1. A method of treating crude cane wax comprising contacting crude cane wax with at least 3 times its weight of propyl alcohol at a temperature sufficient to place the waxy portion in solution while maintaining the alcohol in liquid phase, then separating the insoluble portion while the waxy portion remains in solution.

2. A method of treating crude cane wax comprising contacting crude cane wax with at least 3 times its weight of n-propyl alcohol at a temperature sufficient to place the waxy portion in solution while maintaining the alcohol in liquid phase, then separating the insoluble portion while the waxy portion remains in solution.

3. A method of treating crude cane wax comprising contacting crude cane wax with at least 3 times its weight of iso-propyl alcohol at a temperature sufficient to place the waxy portion in solution while maintaining the alcohol in liquid phase, then separating the insoluble portion while the waxy portion remains in solution.

4. A method of treating crude cane wax comprising contacting crude cane wax within the range of about 8 to about 15 times its weight of propyl alcohol at a temperature sufficient to place the waxy portion in solution while maintaining the alcohol in liquid phase, then separating the insoluble portion by filtration while the waxy portion remains in solution.

5. A method of treating crude cane wax comprising contacting crude cane wax within the range of about 8 to about 15 times its weight of n-propyl alcohol at a temperature sufficient to place the waxy portion in solution while maintaining the alcohol in liquid phase, then separating the insoluble portion by filtration while the waxy portion remains in solution.

6. A method of treating crude cane wax comprising contacting crude cane wax within the range of about 8 to about 15 times its weight of iso-propyl alcohol at a temperature sufficient to place the waxy portion in solution while maintaining the alcohol in liquid phase, then separating the insoluble portion by filtration while the waxy portion remains in solution.

7. A method of treating crude cane wax comprising contacting crude cane wax with at least 3 times its weight of propyl alcohol at a temperature sufficient to place the waxy portion in solution while maintaining the alcohol in liquid phase, separating the insoluble portion while the waxy portion remains in solution, cooling the filtrate to a temperature of not more than 35° C. to precipitate the hard fraction and separating the hard fraction from the solution of soft fraction in propyl alcohol.

8. A method of treating crude cane wax comprising contacting crude cane wax with at least 3 times its weight of n-propyl alcohol at a temperature sufficient to place the waxy portion in solution while maintaining the alcohol in liquid phase, separating the insoluble portion while the waxy portion remains in solution, cooling the filtrate to a temperature of not more than 35° C. to precipitate the hard fraction and separating the hard fraction from the solution of soft fraction in n-propyl alcohol.

9. A method of treating crude cane wax comprising contacting crude cane wax with at least 3 times its weight of iso-propyl alcohol at a temperature sufficient to place the waxy portion in solution while maintaining the alcohol in liquid phase, separating the insoluble portion while the waxy portion remains in solution, cooling the filtrate to a temperature of not more than 35° C. to precipitate the hard fraction and separating the hard fraction from the solution of soft fraction in iso-propyl alcohol.

10. A method of treating crude cane wax comprising contacting crude cane wax with at least 3 times its weight of propyl alcohol at a temperature sufficient to place the waxy portion in solution while maintaining the alcohol in liquid phase, separating the insoluble portion while the waxy portion remains in solution, cooling the filtrate to a temperature within the range of from about 15° C. to 30° C. to precipitate the hard fraction, and separating the hard fraction from the solution of soft fraction in propyl alcohol.

11. A method of treating crude cane wax comprising contacting crude cane wax with at least 3 times its weight of n-propyl alcohol at a temperature sufficient to place the waxy portion in solution while maintaining the alcohol in liquid phase, separating the insoluble portion while the waxy portion remains in solution, cooling the filtrate to a temperature within the range of from about 15° C. to 30° C. to precipitate the hard fraction, and separating the hard fraction from the solution of soft fraction in n-propyl alcohol.

12. A method of treating crude cane wax comprising contacting crude cane wax with at least 3 times its weight of iso-propyl alcohol at a temperature sufficient to place the waxy portion in solution while maintaining the alcohol in liquid phase, separating the insoluble portion while the waxy portion remains in solution, cooling the filtrate to a temperature within the range of from about 15° C. to 30° C. to precipitate the hard fraction, and separating the hard fraction from the solution of soft fraction in iso-propyl alcohol.

EDWARD A. WILDER.

REFERENCES CITED

The following references are of record in the file of this patent:

UNITED STATES PATENTS

| Number | Name | Date |
|---|---|---|
| 1,836,020 | Freytag | Dec. 15, 1931 |
| 2,391,893 | Goepfert | Jan. 1, 1946 |
| 2,430,012 | Goepfert | Nov. 4, 1947 |